(12) United States Patent
Shirasaka

(10) Patent No.: US 10,210,436 B2
(45) Date of Patent: Feb. 19, 2019

(54) PRINTING APPARATUS AND PRINTING CONTROL DEVICE

(71) Applicant: Oki Data Corporation, Tokyo (JP)

(72) Inventor: Mitsuyoshi Shirasaka, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 15/601,624

(22) Filed: May 22, 2017

(65) Prior Publication Data

US 2017/0344861 A1 Nov. 30, 2017

(30) Foreign Application Priority Data

May 31, 2016 (JP) .................................. 2016-108806

(51) Int. Cl.
| | |
|---|---|
| *G06K 15/12* | (2006.01) |
| *B41J 5/32* | (2006.01) |
| *G06K 17/00* | (2006.01) |
| *B41J 11/66* | (2006.01) |
| *B41J 11/70* | (2006.01) |
| *G06K 15/02* | (2006.01) |
| *B41J 5/31* | (2006.01) |
| *B41J 5/46* | (2006.01) |

(52) U.S. Cl.
CPC .............. *G06K 15/128* (2013.01); *B41J 5/32* (2013.01); *B41J 11/663* (2013.01); *B41J 11/703* (2013.01); *G06K 15/024* (2013.01); *G06K 15/1868* (2013.01); *G06K 17/0012* (2013.01); *B41J 5/31* (2013.01); *B41J 5/46* (2013.01); *G06K 15/02* (2013.01); *G06K 17/0003* (2013.01)

(58) Field of Classification Search
None
See application file for complete search history.

(56) References Cited

U.S. PATENT DOCUMENTS

| | | | |
|---|---|---|---|
| 2008/0159800 A1* | 7/2008 | Wada .................... | B26D 5/005 400/621 |
| 2016/0059590 A1* | 3/2016 | Kako .................... | B41J 11/663 347/218 |
| 2016/0217353 A1* | 7/2016 | Nagashima ............ | G06K 15/16 |

FOREIGN PATENT DOCUMENTS

JP     2012-228839 A     11/2012

* cited by examiner

*Primary Examiner* — Frantz Bataille
(74) *Attorney, Agent, or Firm* — Metrolexis Law Group, PLLC

(57) ABSTRACT

A printing apparatus according to an embodiment includes: a conveying device which conveys a record medium in a conveyance direction; a cutter which cuts out the record medium; a printing unit which prints an image on the record medium; a mark detector which detects a reference mark indicating a page start position of the record medium; a receiver which receives record medium type information; and a controller which, based on a content of the record medium type information, switches a cut position to be cut with the cutter between a first position being a position upstream in the conveyance direction by a predetermined one-page length from the page start position and a second position being a position shifted in the conveyance direction by a prescribed length from the first position.

9 Claims, 7 Drawing Sheets

WITHOUT HALF-CUT PORTIONS

WITH HALF-CUT PORTIONS

PRINTING APPARATUS AND PRINTING CONTROL DEVICE

CROSS REFERENCE TO RELATED APPLICATIONS

This application claims priority based on 35 USC 119 from prior Japanese Patent Application No. 2016-108806 filed on May 31, 2016, entitled "PRINTING APPARATUS AND PRINTING CONTROL DEVICE", the entire contents of which are incorporated herein by reference.

BACKGROUND

1. Field

This disclosure relates to a printing apparatus (a printer) which prints an image on a record medium, and to a printing control device (a printer control device) which controls the printing apparatus.

2. Description of Related Art

There has been proposed a printer which includes: a sensor that detects marks provided at regular intervals on rolled paper as a record medium; a printing unit that starts printing based on the position of a detected mark; and a cutter mechanism (a cutter) that cuts out the rolled paper based on the position of the mark detected next (for example, see Patent Document 1: Japanese Patent Application Publication No. 2012-228839).

SUMMARY

The above-described printer may use, as the record medium, a label paper sheet (so-called piggyback label sheet) made from combining a baking sheet and an adhesive label sheet including plural adhesive labels separated by cuts (so-called half-cut lines) therebetween. In this case, a cut position on the record medium cut out by the cutter mechanism may not coincide with the half-cut line. Small shreds of the adhesive labels may be formed between the actual cut position and the half-cut line, and the small shred may possibly adhere (by winding around or getting stuck, for example) to the cutter mechanism, a medium conveyance mechanism or the like, thereby developing an error state that disables normal operation of the printer or causing damage on any of the mechanisms in the printer.

An object of an embodiment of the invention is to avoid occurrence of the error state that disables normal operation of the printer, and to avoid occurrence of damage on the mechanisms.

An aspect of the invention is a printing apparatus that includes: a conveying device which conveys a record medium in a conveyance direction; a cutter which cuts out the record medium; a printing unit which prints an image on the record medium; a mark detector which detects a reference mark indicating a page start position of the record medium; a receiver which receives record medium type information; and a controller programed to, based on a content of the record medium type information, switch a cut position to be cut with the cutter between a first position being a position upstream in the conveyance direction by a predetermined one-page length from the page start position and a second position being a position shifted in the conveyance direction by a prescribed length from the first position.

According to the aspects of the invention, it is possible to avoid occurrence of an error state that disables normal operation of the printing apparatus and occurrence of damage on a mechanism in the printing apparatus, by changing a cut position depending on the type of the record medium.

DETAILED DESCRIPTION OF EMBODIMENTS

Figure 1A:
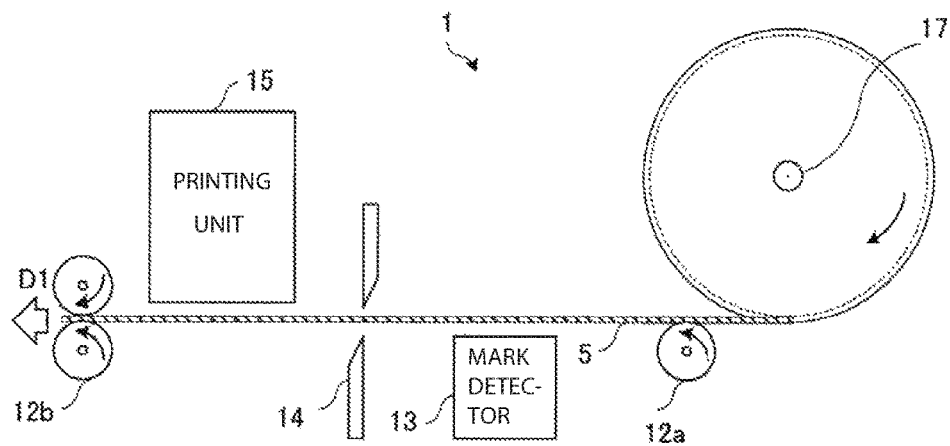
FIG. 1A is a schematic diagram illustrating a structure of a printer according to one or more embodiments.

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only.

In the following embodiments, a printer system includes a printer (also referred to as a "printing apparatus" or an "image formation apparatus" as appropriate) which prints an image on a record medium based on printing data, and a printing control device (also referred to as a "printer driver device" or a "printer control device" as appropriate) which handles user input for setting up printing conditions of the printer. Note that the printer is equivalent to the printer system if the printer has a function to set up the printing conditions and a function to generate the printing data (i.e., functions of the printing control device).

<<1>> First Embodiment

<<1-1>> Configuration of First Embodiment

Figure 1B:
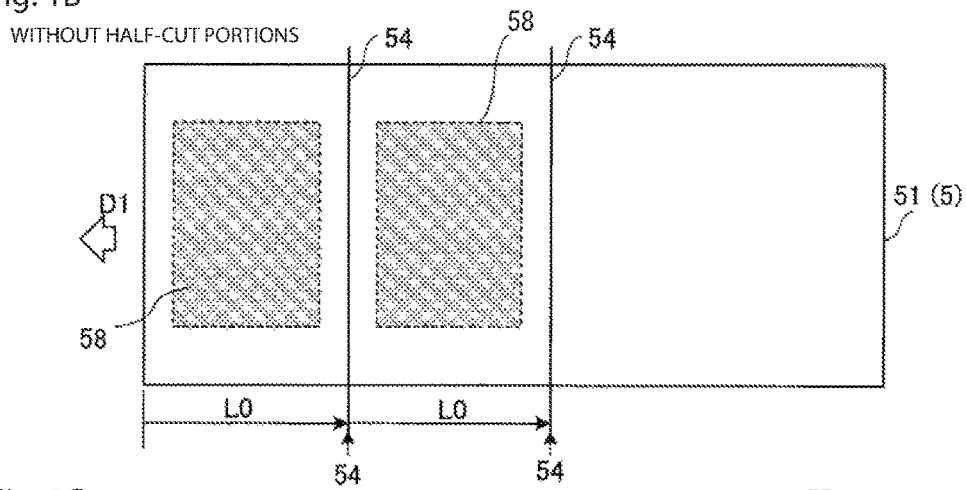
FIG. 1B is a plan view schematically illustrating a back side of a label paper sheet (without half-cut lines) serving as a record medium.
Figure 1C:
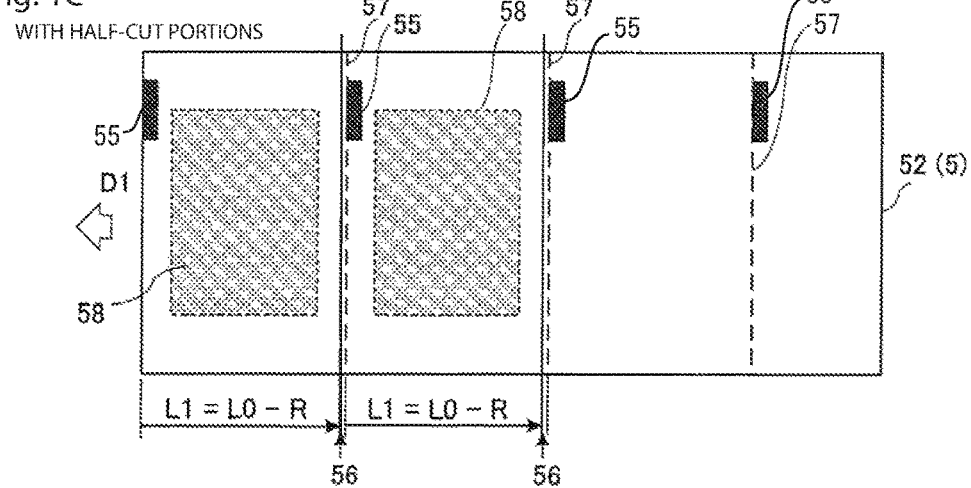
FIG. 1C is a plan view schematically illustrating a back side of a label paper sheet (with half-cut lines) serving as the record medium.

FIG. 1A is a schematic diagram illustrating a structure of printer 1 according to one or more embodiment, FIG. 1B is a plan view schematically illustrating a back side of label paper sheet 51 without half-cut lines (or separation inducing lines) serving as record medium 5, and FIG. 1C is a plan view schematically illustrating a back side of label paper sheet 52 with half-cut lines (or separation inducing lines) serving as record medium 5. In general, each of label paper sheets 51 and 52 is formed from a backing sheet, and an adhesive label sheet provided with an adhesive surface and laminated on the backing sheet. The label paper sheet 52 with half-cut lines includes the adhesive label sheet that is divided into plural adhesive labels by cuts (so-called half cut lines) therebetween. Note that record medium 5 is not limited only to such a label paper sheet. In addition, record medium 5 does not always have to be rolled up. Furthermore, the types of record medium 5 are not limited to those illustrated in FIGS. 1B and 1C.

As illustrated in FIG. 1A, printer 1 includes: medium supporter 17 which supports a rolled medium (rolled paper) serving as rolled record medium 5; and conveyance rollers 12a and 12b collectively serving as conveying device 12 that draws each record medium 5 out of the rolled medium supported by medium supporter 17 and conveys record medium 5 in a conveyance direction D1. Moreover, printer 1 includes: mark detector 13 serving as a medium position detector which detects reference marks 55 for positional reference provided on a back side of record medium 5 (such as the back side of the backing sheet of label paper sheet 52, i.e., a lower surface in FIG. 1A); cutter 14 serving as a cutting device that cuts out record medium 5; and printing unit 15 serving as a printing device or an image formation unit that forms an image (such as printed image 58) based on inputted image data on a top side of record medium 5 (such as the adhesive label sheet of label paper sheet 52, i.e., an upper surface in FIG. 1A). Conveying device 12 includes: rollers (or paired rollers) 12a and 12b; a drive force generator (not illustrated) such as a motor that generates a drive force for rotating rollers 12a and 12b; and a drive force transmission mechanism (not illustrated) such as gears that transmit the drive force to rollers 12a and 12b. Meanwhile, a conveyance speed in the conveyance direction D1 of record medium 5 by conveying device 12 is a preset speed. For this reason, a draw length of record medium 5 (i.e., a travel distance of record medium 5) by means of conveying device 12 can be derived from the conveyance speed and a conveyance period. Instead, however, printer 1 may be provided with a distance measurement unit that measures the travel distance of record medium 5.

Each half-cut line 57 of label paper sheet 52 as record medium 5 in FIG. 1C is formed, for example, as a cut provided at a boundary between adhesive labels (pages) of the adhesive label sheet on the backing sheet or a cut defining each adhesive label, to facilitate separating the adhesive labels from one another or to facilitate peeling of the adhesive labels off the backing sheet. Reference marks 55 are also referred to as "black marks". Each reference mark 55 indicates a start position on one page (a printing page) (also referred to as a "page start position" or a "page boundary position") of record medium 5. Reference marks 55 are arranged at regular intervals in the conveyance direction D1 of record medium 5, for example. In general, a front end in the conveyance direction D1 of each reference mark 55 coincides with the page start position. However, the front end in the conveyance direction D1 of each reference mark 55 does not always have to coincide with the page start position as long as reference mark 55 is provided as a mark that enables detection of the page start position (for example, as a mark disposed at such a position shifted by a prescribed distance from the page start position). Moreover, although printing unit 15 is disposed downstream in the conveyance direction D1 (away from the rolled paper) relative to cutter 14 in FIG. 1A, printing unit 15 may be disposed upstream in the conveyance direction D1 (close to the rolled paper) relative to cutter 14 instead. Furthermore, the structure of printer 1 is not limited only to the structure illustrated in FIG. 1A.

Figure 2:
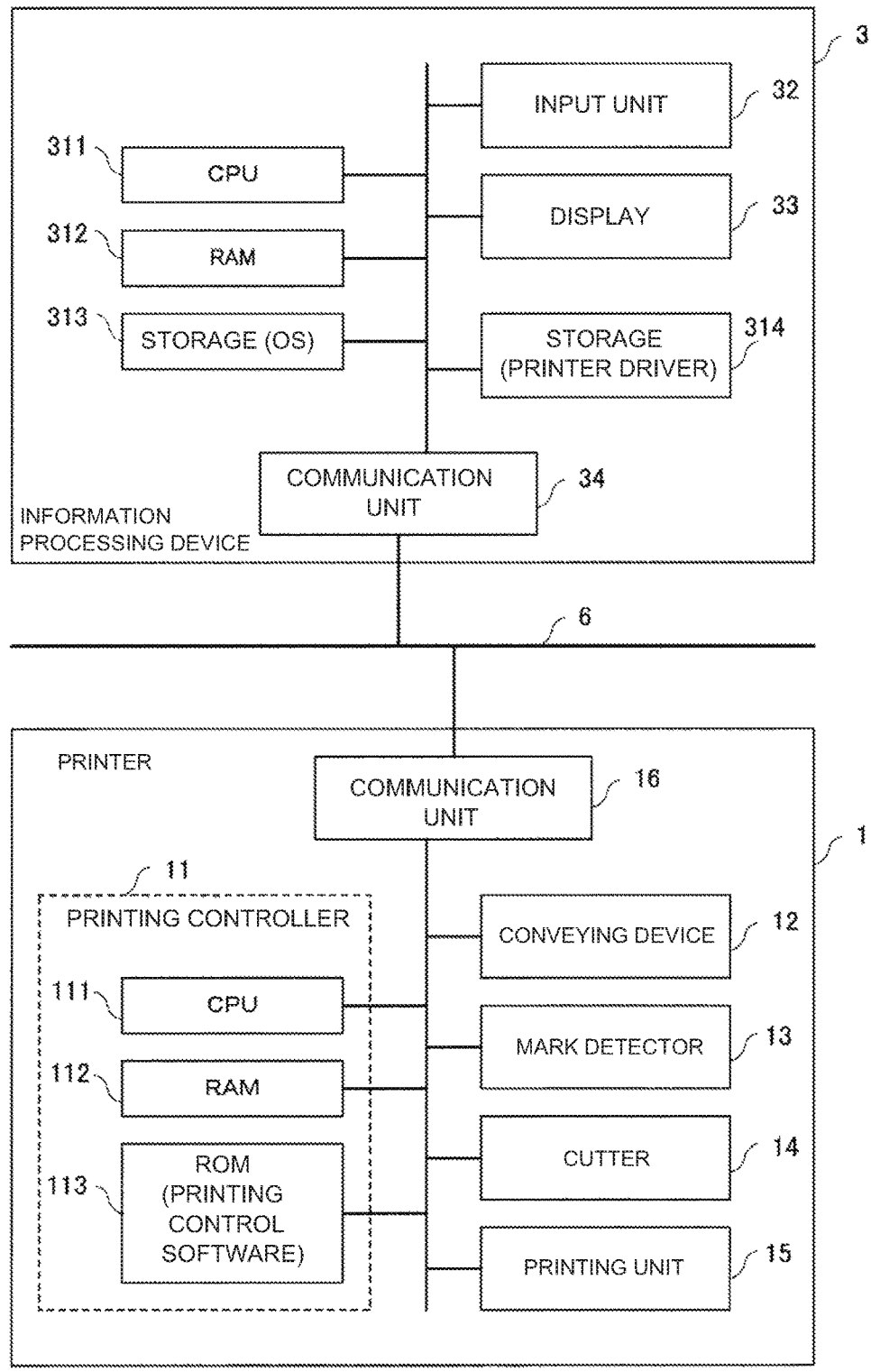
FIG. 2 is a block diagram schematically illustrating a hardware configuration of a printer system according to a first embodiment.

FIG. 2 is a block diagram schematically illustrating a hardware configuration of a printer system according to a first embodiment. The printer system includes: printer 1 which is provided with communication unit (first communication unit) (receiver) 16 that performs communication (transmission and reception of signals); and information processing device 3 being a printing control device (a printer control device), which is provided with communication unit (second communication unit) (transmitter) 34 that performs communication (transmission and reception of signals) with communication unit 16 through a transmission path such as network 6, stores a printer driver that is software for controlling the printer, and transmits printing data inclusive a control command to the printer. Communication units 16 and 34 perform reception or transmission of information through the network. Each of communication units 16 and 34 may be formed as a wired communication unit or a wireless communication unit. Moreover, communication methods to be applied to communication units 16 and 34 are not limited to particular methods. Printer 1 is a color printer, a black-and-white printer, a copier, a facsimile, a multifunction peripheral (MFP), or the like. Meanwhile, information processing device 3 is not limited only to a personal computer which stores the printer driver, but may also be a tablet terminal, a smartphone, or the like provided with a printing application that is the software to control the printer.

As illustrated in FIG. 2, printer 1 includes: communication unit 16; conveying device 12 which conveys record medium 5 in the conveyance direction D1; cutter 14 which cuts out record medium 5; printing unit 15 which prints an image on record medium 5; mark detector 13 which detects each reference mark (also referred to as the "black mark") being provided on the back side of record medium 5 (the back side of the backing sheet) and indicating the page start position of record medium 5; and printing controller (controller) 11. A printing method adopted by printing unit 15 is an electrophotographic method or an inkjet method, for example. However, the printing method to be adopted by printing unit 15 is not limited only to these methods. Printing controller 11 includes, for example: ROM (read only memory) 113 serving as a storage or a memory to store printing control software being a program for controlling the printing by analyzing the image data; RAM (random access memory) 112 serving as a storage or a memory to temporarily store various data as well as the image data; and CPU (central processing unit) 111 serving as an information processing unit (a processor) which executes the printing control software. In the meantime, the constituents inside printer 1 are connected to one another through an internal bus.

Information processing device 3 includes: input unit 32 to which record medium type information is inputted in order to set medium information necessary for controlling the printer; display 33; and communication unit 34. The record medium type information is information of the type of the record medium. Input unit 32 may be an operation unit used for inputting the record medium type information by means of user operation, for example. Such an operation unit includes a keyboard, a mouse, and/or a touch panel, for instance.

Information processing device 3 further includes: storage 313 or a memory which stores an OS (operating system) serving as basic software; storage 314 or a memory which stores the printer driver which is a program for driving the printer; RAM (random access memory) 312 for temporarily storing data; and CPU 311 serving as an information processing unit (a processor) which executes the printer driver.

In the meantime, the constituents inside information processing device 3 are connected to one another through an internal bus.

Based on the contents of the record medium type information sent from information processing device 3, printing controller 11 switches a cut position to be cut with cutter 14 between first position 54 being a position upstream in the conveyance direction D1 by a predetermined one-page length (L0 (a first cut length) in FIG. 1B) from the page start position and second position 56 being a position shifted in the conveyance direction D1 by a prescribed length R from first position 54. As illustrated in FIG. 1C, second position 56 is a position at a distance L1 (=L0−R) (a second cut length) away from the page start position, for example.

When record medium 5 is a half-cut medium, which is a medium having half-cut lines as described above, no shred between second position 56 as the actual cut position and half-cut line 57 is generated by conducting a processing to move (deliberately separate) second position 56 being a cut position of record medium 5 with cutter 14 away from half-cut line 57. In this way, when record medium 5 is cut out at a position away by a certain distance (such as a width of 3 mm or more) from half-cut line 57, a small shred (of a width of 1 mm or less, for example) is not generated. Here, it is also possible to set second position 56 to a position at a distance L1 (=L0+R) away from the page start position. Nonetheless, the page start position of the next page is slightly removed (and a range to the page start position after next is wasted) in this case. Accordingly, it is desirable to set second position 56 to the position at the distance L1 (=L0−R).

Figure 3:
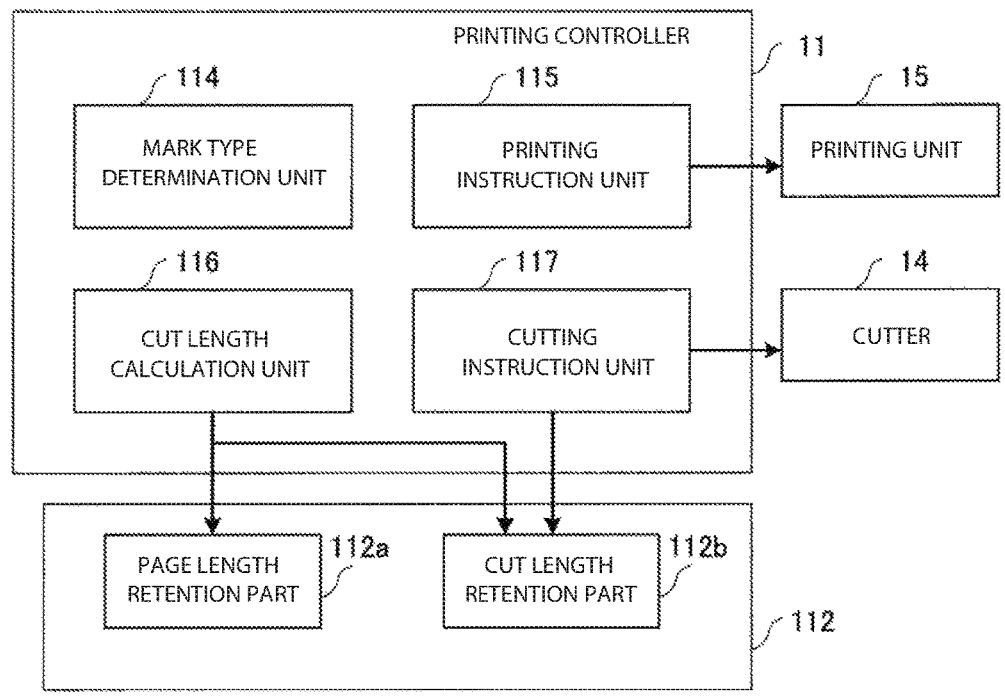
FIG. 3 is a block diagram illustrating functional blocks of a printing controller indicated in FIG. 2.

FIG. 3 is a block diagram illustrating functional blocks of printing controller 11 indicated in FIG. 2. Printing controller 11 includes mark type determination unit 114, printing instruction unit 115, cut length calculation unit 116, and cutting instruction unit 117. Mark type determination unit 114 determines the type of the reference mark read (optically read, for example) with mark detector 13. The type of the reference mark can be determined based on the size, position, color, and design of the reference mark, the number of the reference marks, and so forth. In the first embodiment, mark type determination unit 114 determines whether a predetermined reference mark (such as a black mark) is present on the back side of record medium 5. Here, the reference mark is generally used for indicating a printing start position, and there are three types of such reference marks, namely, the "black mark" printed in advance with a black line on the back side of the record medium, "gap" (a portion only with the backing sheet) as a mark indicating the backing sheet portion located between labels, and "no mark" which means there is no mark.

When printing instruction unit 115 receives the image data as well as an instruction signal to execute printing from information processing device 3, printing instruction unit 115 sends printing unit 15 a printing signal based on the image data. Printing unit 15 forms an image on record medium 5 based on the inputted image data.

Cut length calculation unit 116 receives the one-page length L0 from information processing device 3, and stores the one-page length L0 in page length retention part (a storage area) 112a of storage 112. Cut length calculation unit 116 obtains the second cut length L1 either by subtracting the prescribed length R from the one-page length L0 or by multiplying the one-page length L0 by a predetermined coefficient. The obtained second cut length L1 is stored in page length retention part (a storage area) 112a of storage 112. Cutting instruction unit 117 provides cutter 14 with an instruction signal so as to cut out record medium 5 at a position located upstream (close to the rolled paper) and at the second cut length L1 away from the page start position.

Figure 4:
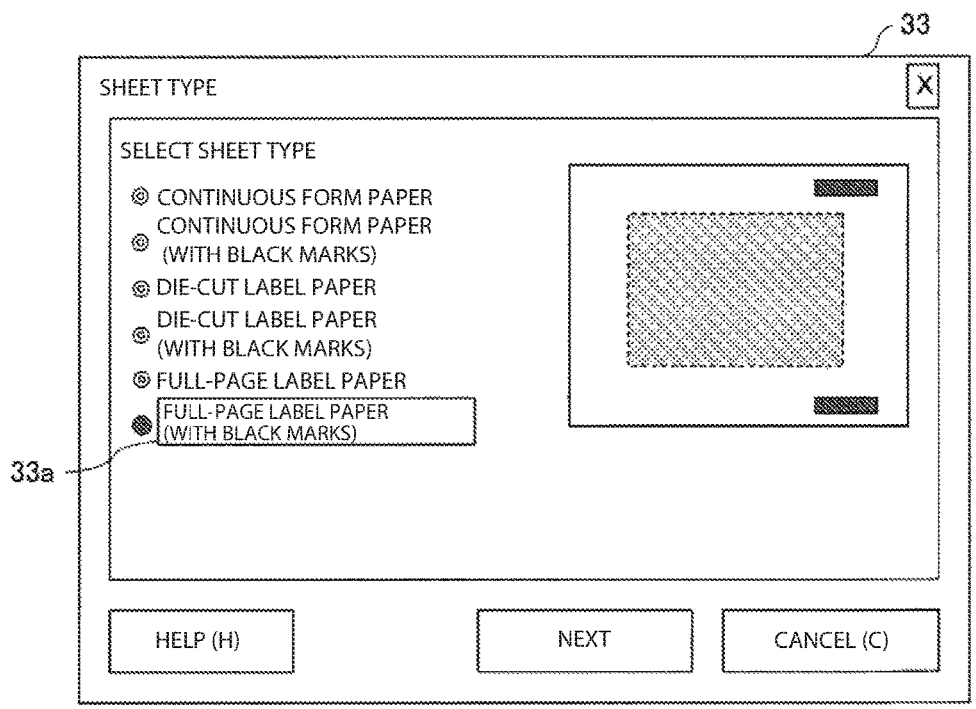
FIG. 4 is a diagram illustrating an example of a display screen on a display indicated in FIG. 2.

FIG. 4 is a diagram illustrating an example of a display screen on display 33 indicated in FIG. 2. FIG. 4 illustrates a printing condition setting screen. A user can select the type of sheet as record medium 5 by using input unit 32 of information processing device 3, out of continuous form paper, continuous form paper with black marks, die-cut label paper, die-cut label paper with black marks, full-page label paper, and full-page label paper with black marks. FIG. 4 illustrates the case where the full-page label paper with black marks is selected. In FIG. 4, when the full-page label paper with black marks is selected, it is highly likely that the record medium contains half-cut lines. Meanwhile, in FIG. 4, designation of the record medium containing the black marks indicating the printing start positions as the sheet type represents that the record medium is targeted for being printed page by page. Moreover, among the sheet types in FIG. 4, the die-cut label paper sheets and the full-page label paper sheets are the sheets that are formed by attaching label paper onto backing sheets. Furthermore, in the case of the full-page label paper where the label paper is attached onto the entire surface of the backing sheet, the label paper on the backing sheet is cut out when a cutting operation takes place. Here, when the label paper contains the half-cut lines, a shred is generated if the label paper is cut out in the vicinity of any of the half-cut lines. On the other hand, in the case of the die-cut label paper, there is no redundant label in a region around each label, or in other words, there is only the backing sheet in that region. Accordingly, if the die-cut label paper is cut out at a position between adjacent pages, there is no label at that position and only the backing sheet is cut out. As a consequence, no label shred is generated by cutting the die-cut label paper.

<<1-2>> Operations of First Embodiment

Figure 5:
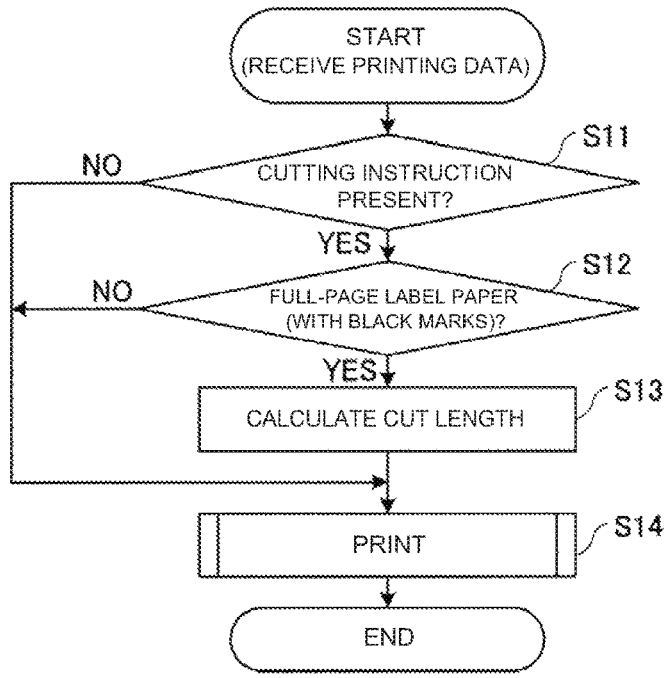
FIG. 5 is a flowchart illustrating operations (at the time of receiving printing data) of the printer in the printer system.

FIG. 5 is a flowchart illustrating an example of operations (at the time of receiving the printing data) of printer 1 in the printer system. As illustrated in FIG. 5, when printing controller 11 of printer 1 receives the printing data from information processing device 3, printing controller 11 analyzes the printing data and determines whether an instruction (a cutting instruction) to cut out record medium 5 is present (step S11). If there is no cutting instruction (NO in step S11), the process goes to printing processing (step S14). When the cutting instruction is present (YES in step S11), the process goes to mark type determination processing (step S12). Here, if the "full-page label (with black marks)" is not designated as the sheet type (NO in step S12), the process goes to the printing processing (step S14).

When the "full-page label (with black marks)" is designated as the sheet type (YES in step S12), printing controller 11 (cut length calculation unit 116) calculates the cut length L1 (step S13). At this time, printing controller 11 (cut length calculation unit 116) first reads the page length L0 retained in page length retention part 112a, and obtains the value (L0−R) by subtracting the prescribed length R (such as 3 mm) determined in advance from the page length L0, and writes the obtained value in cut length retention part 112b as the cut length L1. Thereafter, the process goes to the printing processing (step S14).

Figure 6:
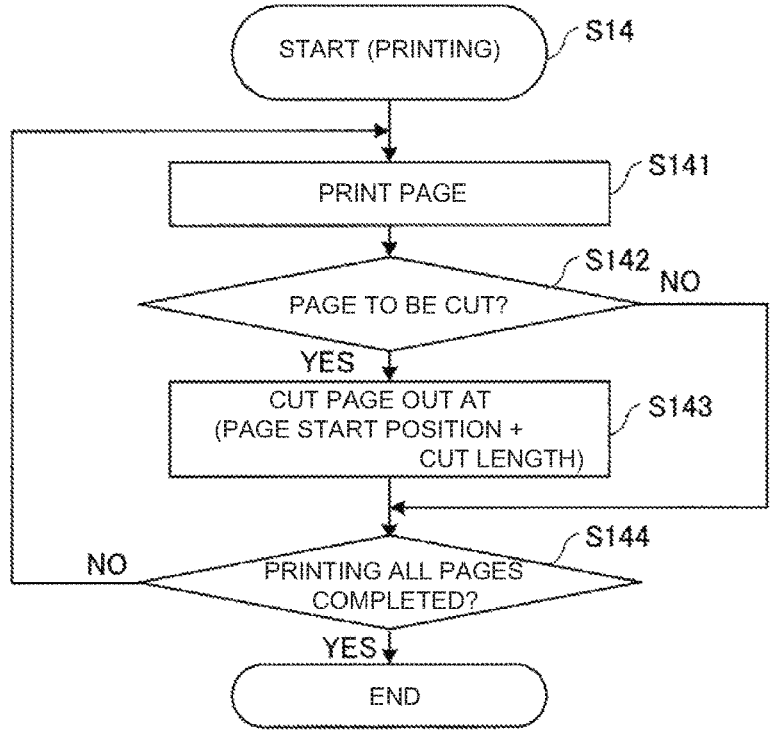
FIG. 6 is a flowchart illustrating operations (at the time of printing) of the printer in the printer system.

FIG. 6 is a flowchart illustrating an example of operations (at the time of printing) of printer 1 in the printer system. As illustrated in FIG. 6, printing controller 11 (printing instruction unit 115) instructs the printing unit 15 to perform printing for one page (step S141). Next, printing controller 11 (cutting instruction unit 117) determines whether the page to be printed is a page (a cut page) designed such that record medium 5 is supposed to be cut out at a terminal end of the page (step S142). If the page to be printed is not the cut page (NO in step S142), printing controller 11 determines whether the printing of all the pages is completed (step S144). When the page to be printed is the cut page (YES in step S142), printing controller 11 (cutting instruction unit 117) causes cutter 14 to cut out record medium 5 at the position located away by the cut length L1 from the page start position (i.e., at the position obtained by adding the cut length L1 to the page start position readout of cut length retention part 112b) (step S143).

Lastly, printing controller 11 determines whether the printing processing of all the pages is completed (step S144). The printing processing is terminated when the printing processing is completed (YES in step S144), or the printing processing returns to step S141 if the printing processing is not completed (NO in step S144).

<<1-3>> Effect of First Embodiment

As described above, according to the printing apparatus (printer 1) and the printing control device (information processing device 3), the cut position applicable to printer 1 is shifted from the next reference mark position in the conveyance direction when the type of the reference mark provided to the record medium used for the printing is a black mark. For this reason, even when record medium 5 is the full-page label paper containing the half-cut lines at the positions of the black marks, no small shreds of the record medium (such as labels) are generated. Thus, it is possible to avoid occurrence of an abnormal operation of printer 1 and thus to avoid damage of printer 1. Moreover, since the black mark serving as the reference mark for the next printing start position and the like is prevented from being cut out after the cutting of the record medium in the first embodiment, it is possible to start the printing operation of the next page at once without wasting the next page.

<<2>> Second Embodiment

<<2-1>> Configuration of Second Embodiment

In the first embodiment, a check box for setting the "half-cut medium" is not provided on the screen for designating the sheet type displayed on display 33 of information processing device 3. On the other hand, in a second embodiment, the cut position is changed when check box 33b for setting the "half-cut medium" is selected on the screen for designating the sheet type displayed on display 33 of information processing device 4.

Figure 7:
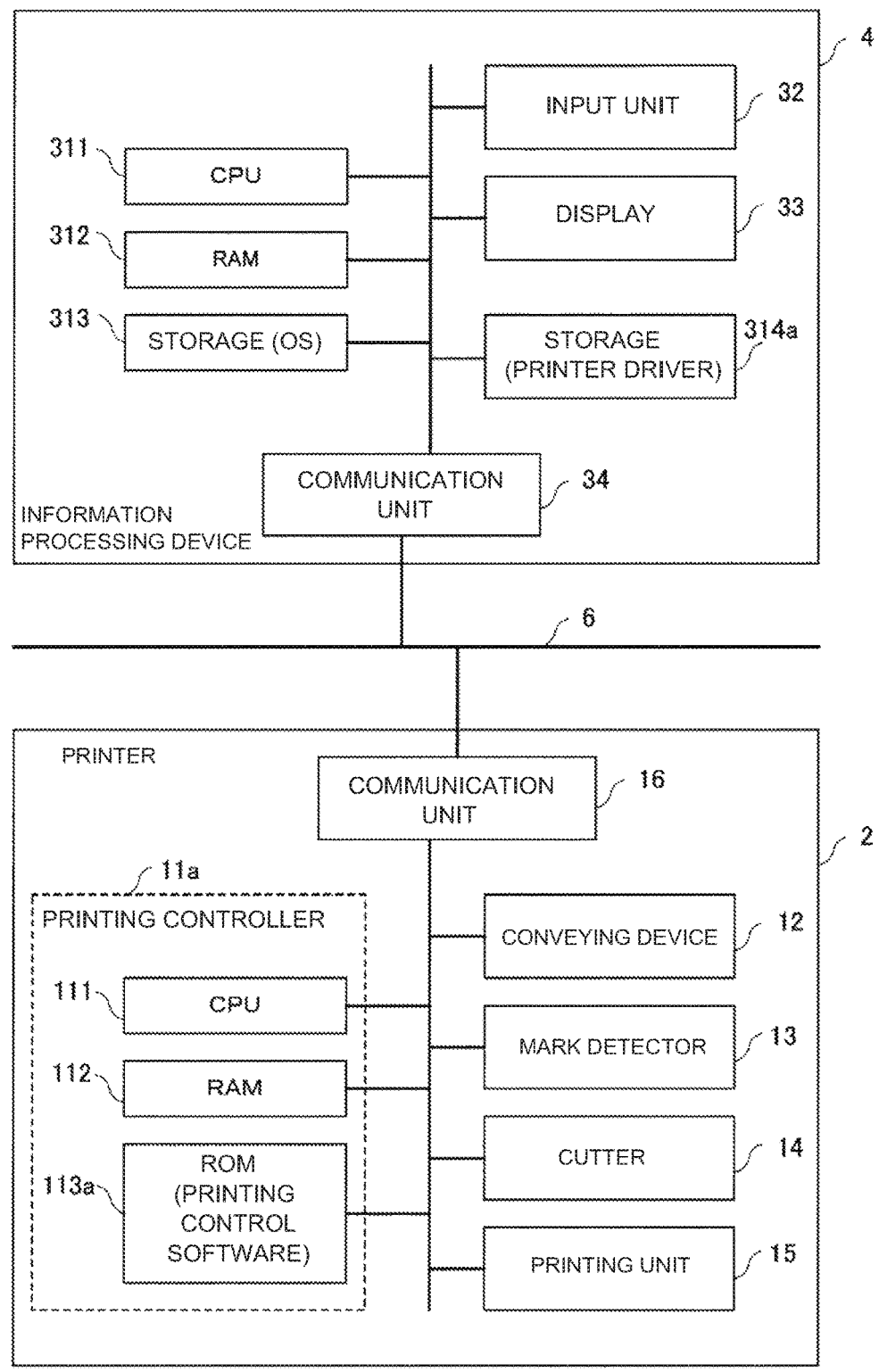
FIG. 7 is a block diagram schematically illustrating a hardware configuration of a printer system according to one or more embodiments.

FIG. 7 is a block diagram schematically illustrating a hardware configuration of a printer system according to the second embodiment. In FIG. 7, constituents which are identical or corresponding to the constituents illustrated in FIG. 2 (the first embodiment) are denoted by the same reference numerals as those indicated in FIG. 2. The printer system according to the second embodiment is different from the printer system according to the first embodiment in terms of a printer driver stored in storage 314a of information processing device 4, and of the screen for setting the sheet type which is displayed on display 33 by the printer driver. Moreover, the printer system according to the second embodiment is also different from the printer system according to the first embodiment in terms of the printing control software stored in ROM 113a of printer 2.

Figure 8:
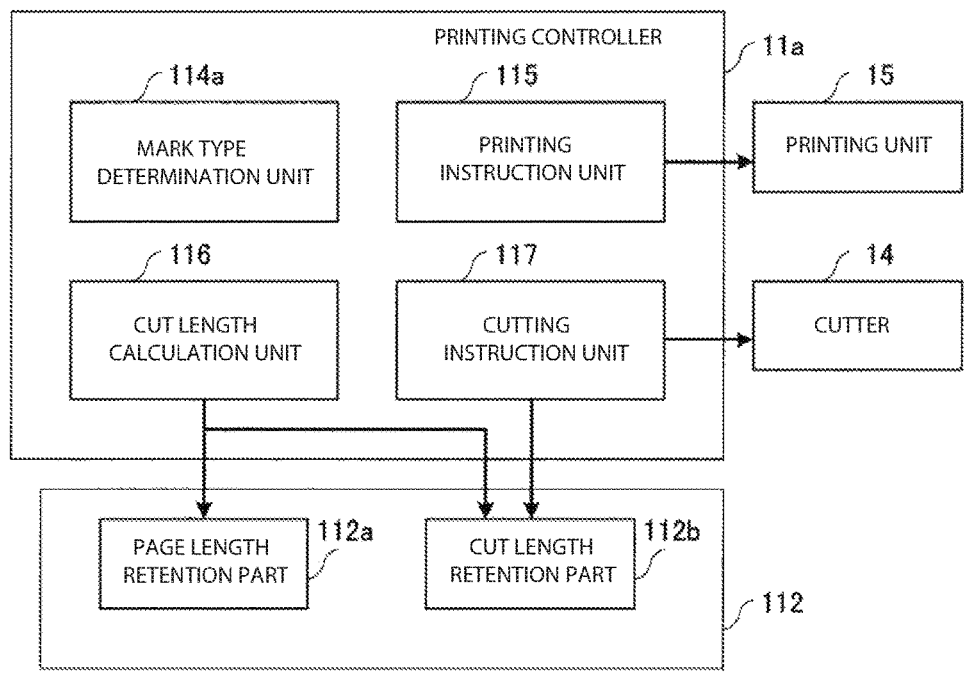
FIG. 8 is a block diagram illustrating functional blocks of a printing controller indicated in FIG. 7.

FIG. 8 is a block diagram illustrating functional blocks of printing controller 11a indicated in FIG. 7. In FIG. 8, constituents which are identical or corresponding to the constituents illustrated in FIG. 3 (the first embodiment) are denoted by the same reference numerals as those indicated in FIG. 3. Printing controller 11a of the printer system according to the second embodiment is different from the printer system according to the first embodiment in that the former printer system includes half-cut determination unit 114a instead of mark type determination unit 114 (FIG. 3).

Figure 9:
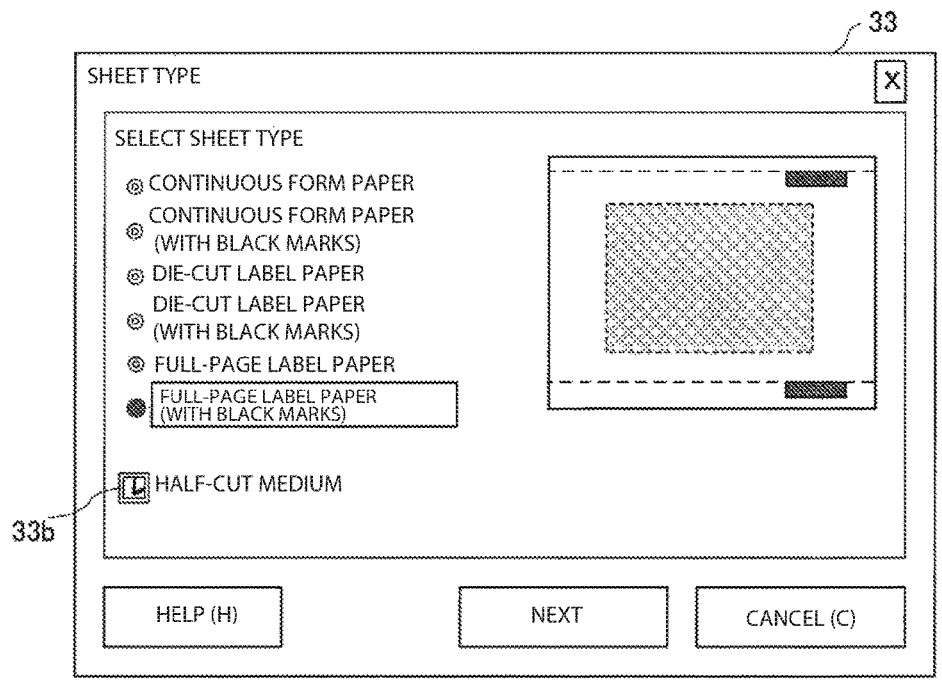
FIG. 9 is a diagram illustrating an example of a display screen on a display indicated in FIG. 7.

FIG. 9 is a diagram illustrating an example of a display screen on display 33 indicated in FIG. 7. The display screen illustrated in FIG. 9 is different from the display screen illustrated in FIG. 4 (the first embodiment) in that check box 33b indicating that record medium 5 is a half-cut medium (a medium having half-cut lines) is added to the former display screen. Except the feature mentioned above, the configuration of the second embodiment is the same as that of the first embodiment.

<<2-2>> Operations of Second Embodiment

Figure 10:
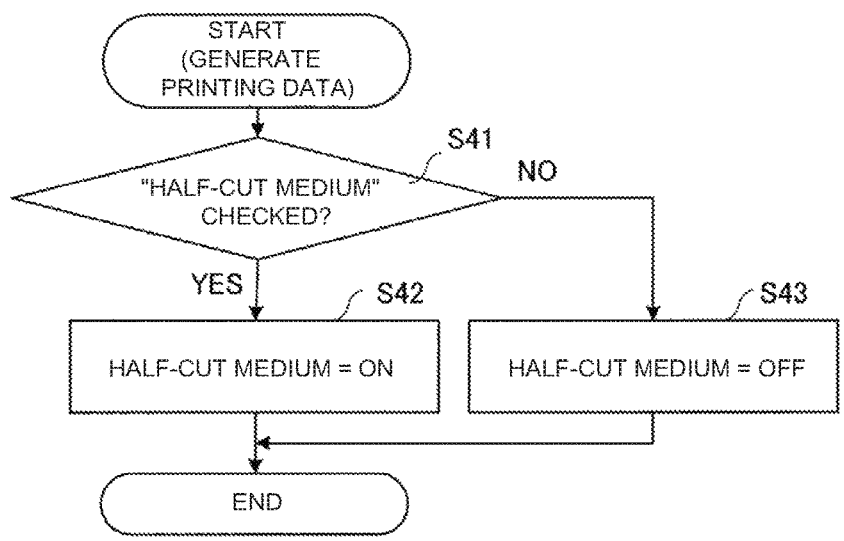
FIG. 10 is a flowchart illustrating operations (at the time of generating printing data) of an information processing device in the printer system.

FIG. 10 is a flowchart illustrating operations (at the time of generating the printing data) of information processing device 4 in the printer system according to the second embodiment. First, when check box 33b is checked at the time of generating the printing data (YES in step S41), information processing device 4 as an example of the printing control device adds information (expressed as "half-cut medium=on"), which indicates that record medium 5 is the half-cut medium, to the generated printing data (step S42). When check box 33b is not checked (NO in step S41), information processing device 4 adds information (expressed as "half-cut medium=off"), which indicates that record medium 5 is not the half-cut medium, to the generated printing data (step S43).

Figure 11:
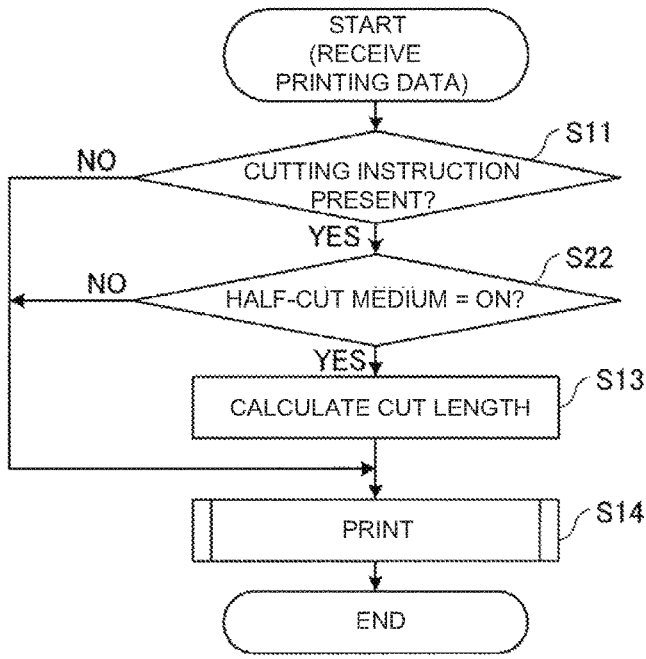
FIG. 11 is a flowchart illustrating operations (at the time of printing) of a printer in the printer system.

FIG. 11 is a flowchart illustrating operations (at the time of printing) of printer 2 in the printer system according to the second embodiment. In FIG. 11, the steps which are identical or corresponding to the steps illustrated in FIG. 5 (the first embodiment) are denoted by the same step numbers as those indicated in FIG. 5. As illustrated in FIG. 11, when printing controller 11a of printer 2 receives the printing data from information processing device 4, printing controller 11a analyzes the printing data and determines whether the instruction (the cutting instruction) to cut out record medium 5 is present (step S11). If there is no cutting instruction (NO in step S11), the process goes to the printing processing (step S14). When the cutting instruction is present (YES in step S11), the process goes to half-cut medium determination processing (step S22). Here, if the "half-cut medium=on" is not designated (NO in step S22), the process goes to the printing processing (step S14).

When the "half-cut medium=on" is designated in the half-cut medium determination processing (YES in step S22), printing controller 11a (cut length calculation unit 116) calculates the cut length L1 (step S13). At this time, printing controller 11a (cut length calculation unit 116) first reads the page length L0 retained in page length retention part 112a, and obtains the value (L0−R) by subtracting the prescribed length R (such as 3 mm) determined in advance from the page length L0, and writes the obtained value in cut length retention part 112b as the cut length L1. Thereafter, the process goes to the printing processing (step S14).

<<2-3>> Effect of Second Embodiment

As described above, according to the printing apparatus (printer 2) and the printing control device (information processing device 4) of the second embodiment, the cut position applicable to printer 2 is shifted from the next reference mark position in the conveyance direction when the type of the reference mark provided to record medium 5 used for the printing is a black mark. For this reason, even when record medium 5 is the full-page label paper containing the half-cut lines at the positions of the black marks, no small shreds of record medium 5 are generated. Thus, it is possible to avoid occurrence of an error state where printer 2 is not operated normally, and thus to avoid damage of a mechanism of printer 2.

The above-described first and second embodiments depict the examples of selecting as to whether the record medium is the half-cut medium by using the screen for selecting the sheet type displayed by means of the operation of the printer driver. Instead, a check box indicating that the record medium is the half-cut medium may be provided on a different setting screen.

<<3>> Modified Examples

The first embodiment depicts the example of defining the cut length L1 as the length obtained by subtracting the prescribed length R of 3 mm from the page length L0. However, the value to be subtracted is not limited to the aforementioned value. In the meantime, while the first and second embodiments depict the example of cutting the page to be printed, this example may result in the cutting in the printing region. Accordingly, in order to avoid the cutting in the printing region, the next page (which is yet to be printed) may be cut out at the position of the cut length L1.

Furthermore, the value and the calculation method of the cut length may be arbitrarily determined as long as it is possible to cut out the record medium at a position between a one-page terminal position (a one-page start position of the next page) and the position of the next mark.

In one or more embodiments, the half-cut line serving as the separation inducing line may be a perforation line, a groove, an incision, or the like. In one or more embodiments, the half-cut line serving as the separation inducing line may be straight or curved.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. A printing apparatus comprising:
   a conveying device which conveys a record medium in a conveyance direction;
   a cutter which cuts out the record medium;
   a printing unit which prints an image on the record medium;
   a mark detector which detects reference marks indicating page start-positions of the record medium;
   a receiver which receives record medium type information; and
   a controller programmed to, based on a content of the record medium type information, switch a cut position to be cut with the cutter between a first position being a position upstream in the conveyance direction by a predetermined one-page length from each of the page start positions and a second position being a position shifted in the conveyance direction by a prescribed length from the first position, wherein
   when the record medium type information indicates that the record medium contains a half-cut line formed at each of the page start positions of the record medium, the controller sets the cut position to the second position such that the record medium is cut at a position shifted toward a leading end of the recording medium by the prescribed length from each of the half-cut lines of the record medium.

2. The printing apparatus according to claim 1, wherein
   a first cut length being a length from the page start position to the first position is equal to the one-page length, and
   a second cut length being a length from the page start position to the second position is shorter than the one-page length.

3. The printing apparatus according to claim 2, wherein the controller obtains the second cut length by subtracting the prescribed length from the first cut length or by multiplying the first cut length by a predetermined coefficient.

4. The printing apparatus according to claim 2, wherein a differential value obtained by subtracting the second cut length from the first cut length is 3 mm or more.

5. The printing apparatus according to claim 1, wherein the cutter is provided upstream of the printing unit in the conveyance direction.

6. The printing apparatus according to claim 1, wherein the cutter cuts the medium completely in the thickness of the recording medium and in the width of the recording medium.

7. The printing apparatus according to claim 1, comprising no half-cut cutter.

8. The printing apparatus according to claim 1, wherein
   when the record medium type information indicates that the record medium that is supported by a medium supporter and is to be conveyed by the conveying device, contains the half-cut line formed at each of the page start positions of the record medium, the controller sets the cut position to the second position such that the record medium is cut at the position shifted toward the leading end of the recording medium by the prescribed length from each of the half-cut lines of the record medium.

9. The printing apparatus according to claim 1, wherein a length of each of the cut record media except for a first one of the cut record media in the conveyance direction is the same as the predetermined one-page length.

* * * * *